Inventor:
Robert C. Mathes.

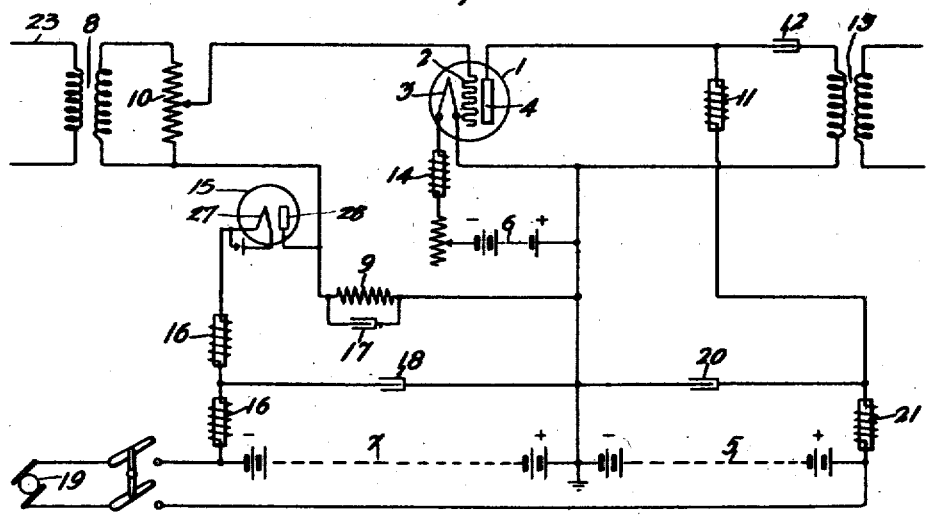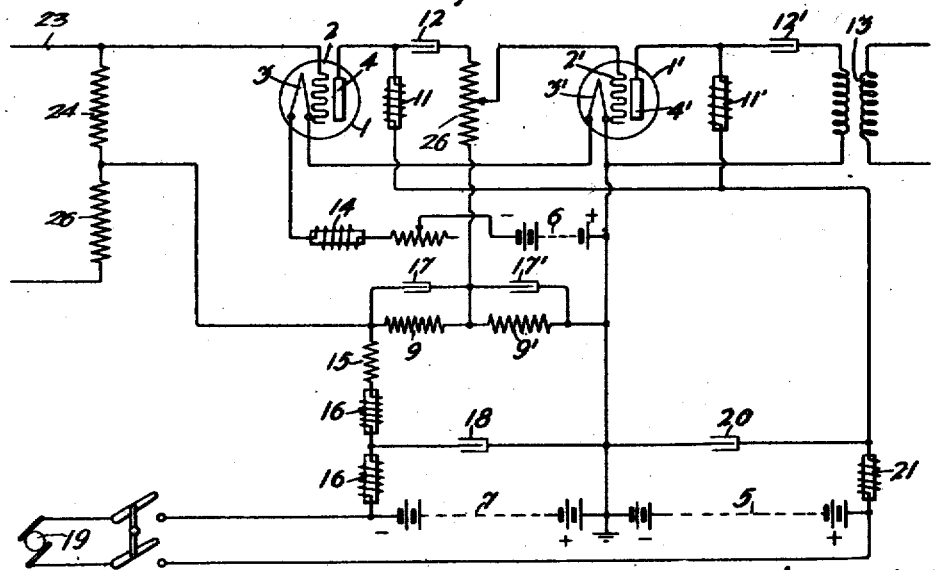

UNITED STATES PATENT OFFICE.

ROBERT C. MATHES, OF NEW YORK, N. Y., ASSIGNOR TO WESTERN ELECTRIC COMPANY, INCORPORATED, OF NEW YORK, N. Y., A CORPORATION OF NEW YORK.

CIRCUITS FOR ELECTRON-DISCHARGE DEVICES.

1,426,754.   Specification of Letters Patent.   Patented Aug. 22, 1922.

Application filed October 23, 1916. Serial No. 127,120½.

*To all whom it may concern:*

Be it known that I, ROBERT C. MATHES, a citizen of the United States, residing at New York, in the county of New York and State of New York, have invented certain new and useful Improvements in Circuits for Electron-Discharge Devices, of which the following is a full, clear, concise, and exact description.

This invention relates to sources of direct current potential for the input circuit of an electron discharge device of the audion type.

An object of the invention is to provide a more convenient and desirable method than has heretofore been used for securing a desired difference of potential between the filament and the grid of a tube of the audion type. A further object is to furnish a method and means for compensating for fluctuations in the potential of the output circuit battery of the vacuum tube.

Specifically, these objects may be realized by the indirect use of the heating battery or of some other source, but in either case associating said source with the output circuit battery.

It is well-known that the current flowing through the output circuit undergoes fluctuations owing to sudden or gradual internal changes within the power battery. Such fluctuations in the space current of the vacuum tube are very troublesome. The method by which this invention overcomes this error may be explained as follows: Assume that the vacuum tube circuits are so arranged, as hereinafter described, that the current for the input circuit comes from a source in series with the source for the output circuit. For illustration, suppose there is a decrease in the potential from the output circuit battery due to some internal change; this will necessarily tend to decrease the space current between the filament and anode of the vacuum tube. If the input and output batteries are of similar nature, this change will in all probability also decrease the potential of the input circuit battery, which is in series with it, so that the grid potential will become less negative thereby tending to increase the space current to its former value. The compensation would take place in a similar manner for an increase in the voltage of the batteries, due, for instance, to the batteries being charged by some suitable means.

This scheme works especially well if the negative grid voltage is derived from the drop of potential across the terminals of a resistance which derives its current from a battery associated with the output circuit battery.

Figure 1:
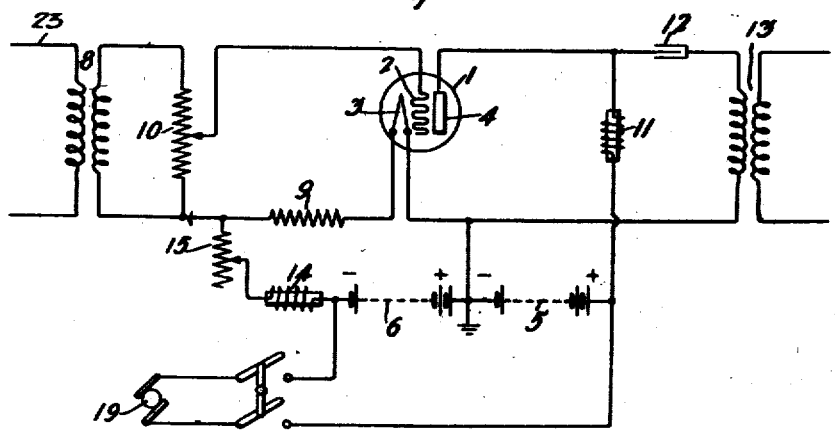
Figure 2:
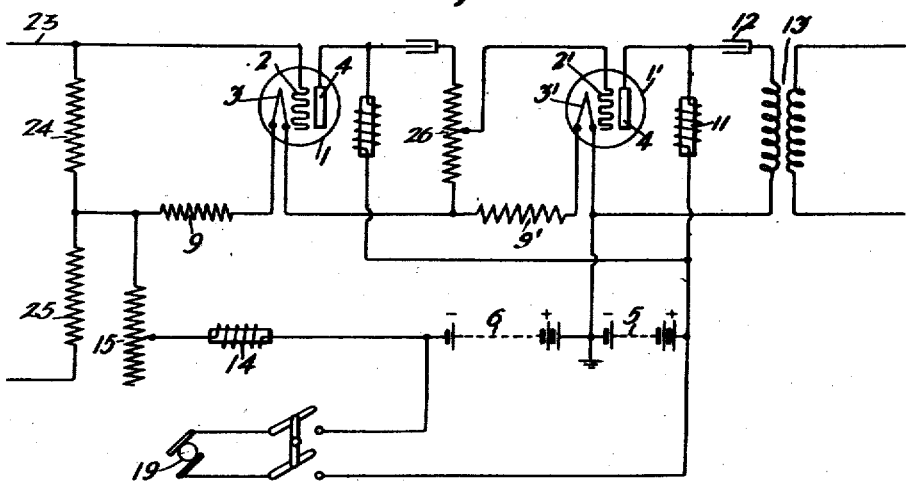

Further objects of the invention will be apparent from the following detailed description and claims taken in connection with the accompanying drawings in which Fig. 1 shows one form of this invention in which the source of input voltage is indirectly taken from a filament battery associated with the output battery; Fig. 2 shows how the arrangement can be applied to vacuum tubes connected in tandem; Fig. 3 gives another arrangement in which some other source of input voltage is associated with the plate circuit supply; Fig. 4 is the arrangement of Fig. 3 applied to two vacuum tubes in tandem. A similar notation is used in all the figures.

In Fig. 1, 1 is a vacuum tube of the audion type containing a grid 2, a filament 3, and an anode 4. The negative voltage for the grid is obtained from the drop of potential across the terminals of a resistance 9. This drop of potential is due to the battery 6, which is the heating source for the filament 3 and is equal to the product of the filament current and the resistance value of 9. The negative grid voltage may be varied by changing either the value of the resistance 15 or resistance 9. 19 is a battery charging generator. The output circuit, besides containing a source of potential 5 and transformer 13, has also an inductance 11 and capacity 12, which afford an easy path for the direct current and the oscillating current respectively.

The arrangement described above is therefore particularly adapted to repeat impulses from an incoming line 23 since they may be impressed by transformer 8 upon the resistance 10, the drop of potential across a portion of which is impressed upon the grid 2. The amplified oscillations in the output circuit by transformer 13 may be impressed upon any suitable outgoing line. A choke coil 14 is shown inserted in series with the battery 6 to prevent any variations in its potential from being impressed on the tube 1.

By the variation of the character of resistance 9, more exact compensation can be obtained for the change in the space current of tube 1. If the system gives under-compensation, the resistance should be constituted of iron wire or some other suitable material having a high positive temperature co-efficient so that its resistance increases with increase of current. However, if the system gives over-compensation, the resistance may be the impedance of a vacuum tube, an impedance which decreases with increase in current. If considered more convenient, resistance 15 or any part thereof may be made with these variable characteristics, in which case the preceding two sentences apply with the terms of "under-compensation" and "over-compensation" interchanged. It is to be understood, however, that practically good results are obtained by the use of resistances 9 and 15 of ordinary character.

In Fig. 2 we have the scheme of Figure 1 used for two vacuum tubes connected in tandem in a manner now well understood in the art. The negative voltage for grid 2 is due to a drop of potential across the terminals of the resistance 9, while for grid 2′ it is due to the drop across the terminals of resistance 9′, both resistances being included in the heating circuit of the two filaments which are here arranged in series but may be connected in parallel if desired. Connected across the line 23, are two resistances 24 and 25, only one of which may be associated with the input circuit of the tube 1, if it is desired to impress on the tube only a portion of the total drop of potential across the line 23. The amplified oscillations in the output circuit of tube 1 are impressed by the impedance 26 upon tube 1′ which is connected to an outgoing line by transformer 13.

In Fig. 3 the negative grid voltage is supplied from the drop of potential across the terminals of the resistance 9, this drop of potential being due to a source of voltage 7 associated with the battery 5 of the output circuit. In order to keep the grid circuit free from the effects of short, sudden fluctuations arising from the battery 7, it will be desirable, in general, to have a condenser 18 shunted across it and inductance 16, 16 inserted in series with the battery. The effects of similar fluctuations in 5 may be avoided or diminished by a condenser 20 and inductance 21. Condenser 17 may be shunted across 9 to serve as an easy path for the oscillations in the input circuit; and particularly it may be used to minimize cross-talk in case more than one amplifier of this type is operated from a common battery. Resistance 15 is shown in Fig. 3 in the form of a vacuum tube having a heated filament 27, and an anode 28. This form of impedance for obtaining the desired voltage for the input circuit is preferable in case the arrangement is such that the use of ordinary resistances would give under-compensation, since as is well known, the impedance of a vacuum tube decreases with increase in current passing therethrough. A similar result may be obtained, as noted above, by employing an ordinary resistance 15 and an iron wire resistance 9, since the iron wire will increase in resistance with increase in current and being in shunt with the grid circuit will take care of any tendency to under-compensation.

In Fig. 4 the same method as in Fig. 3 is illustrated for two vacuum tubes in tandem. The two filaments 3 and 3′ are shown connected in series with a heating source 6. The two resistances 9 and 9′ are also connected in series, their common source of current being the battery 7. The various condensers and inductances are inserted for reasons previously given. All the resistances shown in these drawings may be of the variable type.

The system may assume still other forms than those herein described without departing in anywise from the spirit of this invention.

It will be noted that the batteries 5 and 6 of Figs. 1 and 2, or the batteries 7 and 5 of Figs. 3 and 4, are of the same type and will therefore be subjected to the same sort of fluctuations. If, for example, these batteries are dry cells, they will gradually drop in voltage as they are used and, as explained heretofore, a gradual drop in the voltage of the output battery will be compensated for by a similar drop in the input battery. If these batteries are storage batteries, there will be a gradual drop in voltage of both input and output batteries during discharge. On closing the switch 19 for charging, there will be a sudden increase in voltage in both batteries followed by a gradual increase during the charging period. In any event any changes common to both batteries tend to compensate each other's effect.

What is claimed is:

1. In an electric translating circuit, an electron discharge device having a heated filament, an anode and a grid, said grid and filament being in the input circuit, a battery for the output circuit, means for bringing the grid to a different potential than the filament, comprising a resistance in the input circuit and a battery for supplying current therefor, the grid-filament steady potential difference being determined substantially solely by the drop in said resistance said means so arranged that gradual fluctuations in the strength of the output battery will be compensated for by fluctuations in the input battery.

2. In an electric translating circuit, an electron discharge device having a heated filament, an anode and a grid, said grid and filament being in the input circuit, a battery for the output circuit, means for bringing the grid to a lower potential than the filament, comprising a resistance in the input circuit and a battery for supplying current therefor, the grid-filament steady potential difference being determined substantially solely by the drop in said resistance, said means so arranged that the effects of fluctuations in the voltage of the output circuit battery will be minimized by fluctuations in the input circuit battery.

3. In an electric translating circuit, an electron discharge device having a filament, an anode and a grid, said filament and grid being in the input circuit, a resistance in said input circuit, an output battery and an input battery in series, said input battery supplying current to the resistance in the input circuit, the grid-filament steady potential difference being determined substantially solely by the drop in said resistance, said batteries being of such a type as to be subject to the same gradual fluctuations whereby the space current will be substantially independent of said fluctuations and means in series with said batteries for simultaneously charging the same.

4. In an electric translating circuit, an electron discharge device having a filament, an anode and a grid, said filament and grid being in the input circuit, a resistance in said input circuit, an output battery and an input battery in series, said input battery serving as the heating source for the filament and also supplying current to the resistance in the input circuit, the grid-filament steady potential difference being determined substantially solely by the drop in said resistance, said batteries being of such a type as to be subject to the same gradual fluctuations whereby the space current will be substantially independent of said fluctuations and means in series with said batteries for simultaneously charging the same.

5. In an electric translating circuit, an electron discharge device having a cathode, an anode and an auxiliary electrode, means for normally maintaining said auxiliary electrode at a lower potential than any part of said cathode, said means comprising a resistance shunted by a circuit containing a source of steady voltage, the normal potential difference between the auxiliary electrode and said cathode being determined principally by the drop in said resistance, and a separate source of space current between said cathode and said anode.

6. In an electric translating circuit, an electron discharge device having a cathode, an anode and an auxiliary electrode, said auxiliary electrode and cathode being in the input circuit of said tube; means for normally maintaining said auxiliary electrode at a lower potential than any part of said cathode, said means comprising a resistance in said input circuit, said resistance being shunted by a source of steady voltage, the normal potential difference between said auxiliary electrode and said cathode being determined principally by the drop in said resistance, and a separate source of space current between said cathode and said anode.

7. In an electric translating circuit, an electron discharge device having a cathode, an anode and an auxiliary electrode, and common means for simultaneously heating said cathode and for bringing said auxiliary electrode to a lower potential than any part of said cathode, the normal potential difference between said auxiliary electrode and said cathode being determined principally by the drop in said resistance.

8. In an electric translating circuit, an electron discharge device having a cathode, an anode and an auxiliary electrode, said auxiliary electrode and said cathode being in the input circuit of said tube, a source of current connected to said cathode, a resistance, a circuit containing said cathode, said source and said resistance in series, said resistance being also included in the input circuit of said tube in such a manner that the potential of said auxiliary electrode is normally maintained lower than any part of said cathode by an amount substantially equal to the drop in said resistance, said cathode being rendered thermionically active by current flowing in said series circuit.

9. In an electric translating circuit, an electron discharge device having a cathode, an anode and an auxiliary electrode, said auxiliary electrode and said cathode being in the input circuit of said tube, a source of current connected to said cathode, a resistance connected in series with said source and said cathode, said resistance being also included in the input circuit of said tube, said cathode being rendered thermionically active by current flowing in said series circuit, the normal potential difference between the auxiliary electrode and said cathode being determined principally by the drop in said resistance.

10. In an electric translating circuit, an electron discharge device having a cathode, an anode and an auxiliary electrode, a resistance, a source of steady voltage for said resistance, and means for impressing the drop of potential across said resistance between said auxiliary electrode and said cathode, whereby the potential of said auxiliary electrode is normally maintained lower than any part of said cathode by an amount substantially equal to the drop in said resistance, and a separate source of space current between said anode and said cathode.

11. The combination with a thermionic device, of an iron wire, a source of current for said wire, and means for supplying the drop of potential across said wire to said device.

12. The combination with a thermionic device having an input circuit, of an iron wire, a source of current for said wire, and means for impressing the drop of potential across said wire upon the input circuit of said device.

13. In combination a vacuum tube having cathode, anode and control electrodes, a source of space current therefor, a second source of current, a path containing resistance traversed by current from said second source, and permanent connections from spaced points on said path to said cathode and control electrodes respectively, the minimum normal potential difference between said control electrode and said cathode being maintained substantially equal to the drop in said resistance between said spaced points.

14. In combination a vacuum tube having cathode, anode and control electrodes, a source of space current therefor, a second source of current, a resistance traversed by current from said second source, and permanent connections from the positive and negative ends of said resistance to said cathode and control electrodes respectively, the potential of said control electrode being normally maintained more negative than the negative end of said cathode by an amount substantially equal to the drop in said resistance.

15. The method of controlling the operation of a vacuum tube circuit the input of which is impressed on a grid and in which the potential of the source of space current is subject to variations, which comprises automatically varying the potential of said grid in such a manner as to compensate for said variations.

16. The method of controlling the operation of a vacuum tube circuit the input of which is impressed on a grid and in which the potential of the source of space current is subject to variations, which comprises automatically making the potential of said grid more negative as said source of space current increases in potential.

17. The method of operating a vacuum tube translating device, the operation of which depends on the voltage of a source of current which is variable, which comprises varying the operation of said translating device in a manner complementary to the change in operation due to a fluctuation of said voltage.

18. A vacuum tube apparatus comprising a plurality of tubes arranged in a series and each having a cathode and a grid, and a normally unipotential connection from the grid of one of said tubes to the cathode of another tube.

19. A vacuum tube apparatus comprising a plurality of tubes arranged in a series and each having a cathode and grid, and a normally unipotential connection from the grid of one of said tubes to the cathode of a preceding tube.

20. A vacuum tube apparatus comprising a plurality of tubes arranged in a series and each having a cathode and grid, and a normally unipotential connection from the grid of one of said tubes to the cathode of the tube next preceding.

21. A vacuum tube apparatus comprising a plurality of tubes arranged in a series and each having a cathode and a grid, and a normally unipotential connection from one grid in the series to the cathode of the first tube of the series.

22. A vacuum tube apparatus comprising a plurality of tubes arranged in a series and each having electrodes, and means for maintaining the potential of an electrode in one of said tubes at a predetermined potential with reference to another electrode of said tube, said means comprising a normally unipotential connection between said electrode and an electrode in a preceding tube of the series.

23. In a multi-stage vacuum tube amplifier in which the anode of one tube is connected conductively to one terminal of a condenser, the other terminal of which is conductively connected to the auxiliary electrode of the next succeeding tube, a connection from said auxiliary electrode to the cathode heating circuit of said succeeding tube, and an impedance in said heating circuit, said auxiliary electrode deriving its steady potential substantially solely from the drop in said impedance.

24. In a multi-stage vacuum tube amplifier, a coupling between two tubes comprising a condenser connected to the anode of one tube and to the auxiliary electrode of the other tube, an impedance between the anode side of the condenser and the space current battery, an impedance between the auxiliary electrode side of the condenser and the filament heating battery, and an impedance between the negative end of the filament of the second tube and said last mentioned impedance.

25. In a vacuum tube amplifier circuit wherein the space current of said amplifier depends upon the voltage of a variable source of current connected to an anode and a cathode, the method which comprises supplying said circuit with at least two impulses, one a compensated impulse derived from an effect produced by variations of said source and the other due to an impulse to be amplified.

26. In a vacuum tube amplifier circuit wherein the space current of said amplifier depends upon the voltage of a variable source of current, the method which comprises supplying said circuit with impulses to be amplified and by-passing a portion of the impulses caused by variations in said source of current to a point in the circuit whereby said last mentioned impulses are rendered self-compensatory.

27. A vacuum tube translating device having a cathode and an anode, a source of space current connected to said cathode and anode, and means responsive to an effect produced by said source of current for changing the impedance of the space between said cathode and said anode in a manner to compensate for changes in said source.

In witness whereof, I hereunto subscribe my name this 9 day of October A. D., 1916.
ROBERT C. MATHES.

DISCLAIMER 1,426,754.—*Robert C. Mathes*, New York, N. Y. CIRCUITS FOR ELECTRON DISCHARGE DEVICES. Patent dated August 22, 1922. Disclaimer filed June 24, 1933, by the assignee, *American Telephone and Telegraph Company*.

Hereby enters this disclaimer to claim 25 of said letters patent, to wit:

"25. In a vacuum tube amplifier circuit wherein the space current of said amplifier depends upon the voltage of a variable source of current connected to an anode and a cathode, the method which comprises supplying said circuit with at least two impulses, one a compensated impulse derived from an effect produced by variations of said source and the other due to an impulse to be amplified."

[*Official Gazette July 25, 1933.*]